United States Patent
Seel

(10) Patent No.: US 8,029,408 B2
(45) Date of Patent: Oct. 4, 2011

(54) METHOD AND CONTROL DEVICE FOR IMPLEMENTING A STARTUP OF A COMBUSTION ENGINE IN A HYBRID VEHICLE

(75) Inventor: Andreas Seel, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 767 days.

(21) Appl. No.: 12/072,410

(22) Filed: Feb. 25, 2008

(65) Prior Publication Data

US 2008/0274856 A1 Nov. 6, 2008

(30) Foreign Application Priority Data

Mar. 6, 2007 (DE) .......................... 10 2007 010 770

(51) Int. Cl.
*B60W 10/02* (2006.01)
*B60W 10/06* (2006.01)
*B60W 10/08* (2006.01)

(52) U.S. Cl. ............................................ 477/5; 477/180
(58) Field of Classification Search ................... 903/930
See application file for complete search history.

(56) References Cited

U.S. PATENT DOCUMENTS

2006/0089232 A1* 4/2006 Kobayashi et al. ............. 477/70
2006/0089235 A1* 4/2006 Kobayashi ..................... 477/107

* cited by examiner

*Primary Examiner* — Edwin A Young
(74) *Attorney, Agent, or Firm* — Kenyon & Kenyon LLP

(57) ABSTRACT

A method for compensating a transmitted torque of a clutch between a regulated drive motor, in particular an electromotor, and a combustion engine in the transition to an operation using only the drive motor, to hybrid operation in which an overall torque is supplied jointly by the drive motor and the combustion engine, and the engine speed of the drive motor is controlled with the aid of a manipulated variable; to implement the transition, the combustion engine is dragged by coupling it with the drive motor with the aid of a proportional clutch having a controllable transmitted torque, and the control of the engine speed of the drive motor is implemented as a function of the transmitted torque using which the drive motor is coupled with the combustion engine.

4 Claims, 1 Drawing Sheet

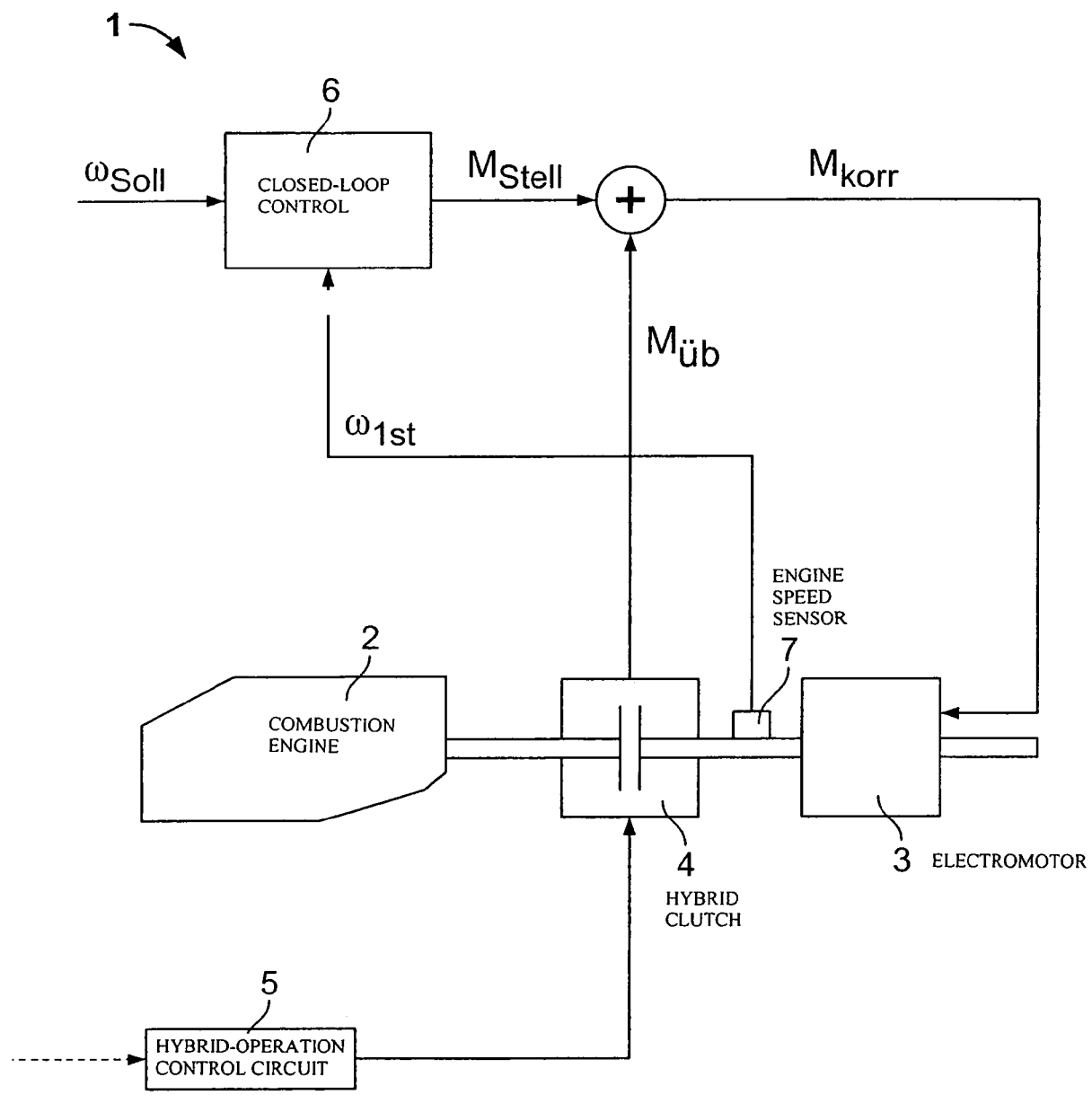

METHOD AND CONTROL DEVICE FOR IMPLEMENTING A STARTUP OF A COMBUSTION ENGINE IN A HYBRID VEHICLE

FIELD OF THE INVENTION

The present invention relates to a method and a control device for controlling the instantaneous clutch torque in a startup of a combustion engine in a hybrid vehicle.

BACKGROUND INFORMATION

In hybrid vehicles, which can be driven both by electromotors only and which, in hybrid operation, additionally also use a combustion engine for driving the vehicle, the combustion engine must first be started in the transition from electric-only operation to hybrid operation. Such hybrid vehicles are typically equipped with a hybrid clutch, which couples the driven shafts of the electromotor and the combustion engine. As a rule, the hybrid clutch is embodied in the form of a sliding clutch or as a proportional clutch. A proportional clutch is a clutch, which, in contrast to a shift-only clutch, is able to set a desired transmitted torque, for instance according to a suitable manipulated variable.

To drag the combustion engine, the hybrid clutch is activated during the electric driving, so that a corresponding specific transmitted torque is transmitted to the combustion engine, and the combustion engine is started. Prior to complete, autonomous running of the combustion engine there is temporary slippage at the hybrid clutch between the stationary or starting combustion engine and the electromotor rotating at a specific engine speed.

In an rpm-regulated electromotor, a torque for starting the combustion engine is transmitted as transmitted torque in the transition from electric-only operation to hybrid operation. The torque picked up by the combustion engine via the hybrid clutch interferes with the closed-loop speed control, thereby causing a considerable system deviation from the setpoint speed, i.e., a drop in the instantaneous engine speed. The driver of the vehicle perceives this as a strong jerk.

SUMMARY OF THE INVENTION

Therefore, it is an object of the exemplary embodiments and/or exemplary methods of the present invention to make the transition from electric-only operation to hybrid operation in a hybrid vehicle more comfortable and, in particular, to reduce the sudden drop in the overall torque in the drive train when starting the combustion engine.

This object is achieved by the method described herein and the device according to the description herein.

Further advantageous developments of the exemplary embodiments and/or exemplary methods of the present invention are also described herein.

According to a first aspect, the method is provided to compensate a transmitted torque of a proportional clutch between a regulated drive motor, in particular an electromotor, and a combustion engine in the transition from an operation using only the drive motor, to hybrid operation. In hybrid operation, an overall torque is provided jointly by the drive motor and the combustion engine. The engine speed of the drive motor is controlled with the aid of a manipulated variable. To implement the transition, the combustion engine is dragged by being coupled to the drive motor via a proportional clutch using a controllable transmission torque.

The control of the engine speed of the drive motor is implemented as a function of the transmitted torque using which the drive motor is coupled to the combustion engine.

The above method has the advantage that in a transition from, for instance, electric-only operation to hybrid operation in a hybrid vehicle, it is possible to start the combustion engine without an annoying sudden drop in the engine speed of the drive motor due to the load of the combustion engine to be dragged. A closed-loop speed control to compensate for the sudden drop in engine speed that occurs in the transition can be managed only with a corresponding control delay so that a torque fluctuation is noticeable despite the closed-loop control. The provided method increases the manipulated variable that controls the drive motor, which may be directly, according to the transmitted torque required by the combustion engine, so that the requesting of the transmitted torque and the corresponding increase in the torque provided by the drive motor essentially take place simultaneously.

Furthermore, the engine speed of the drive motor may be regulated in order to set an actual speed to a setpoint speed, the manipulated variable being acted upon by a datum regarding the transmitted torque in order to obtain a corrected manipulated variable.

According to another specific embodiment, the manipulated variable corresponds to an actuating torque, and the actuating torque is increased by the datum of the transmitted torque in order to obtain as corrected manipulated variable a corrected actuating torque for control of the drive motor.

Furthermore, the transmitted torque is able to be measured or estimated.

According to another aspect, a device is provided to compensate a transmitted torque between a regulated drive motor, in particular an electromotor, and a combustion engine in a transition to hybrid operation in which the combustion engine is started up. The device includes an open-loop speed control to control the engine speed of the drive motor according to a manipulated variable, and a clutch in order to couple the combustion engine to the drive motor in the transition, so that the combustion engine is dragged at a specific transmitted torque. A transmitted-torque supply device is provided to supply a datum for the transmitted torque, the open-loop speed control being configured to control the engine speed of the drive motor as a function of the transmitted torque.

Furthermore, the open-loop speed control may be encompassed in a closed-loop speed control, which regulates the engine speed of the drive motor so as to set an instantaneous engine speed to a setpoint speed, the manipulated variable of the closed-loop speed control being acted upon by the datum regarding the transmitted torque in order to obtain a corrected manipulated variable.

According to another specific embodiment, the manipulated variable may correspond to an actuating torque, and a summing element is provided in order to increase the actuating torque by the datum of the transmitted torque, so that a corrected actuating torque is obtained as corrected manipulated variable for the control of the drive motor.

Furthermore, a transmitted-torque supply unit may be provided to measure or estimate the torque transmitted by the clutch.

A hybrid-operation control circuit may be provided for controlling the clutch according to a manipulated clutch variable, the manipulated clutch variable being provided as datum for the transmitted torque.

Exemplary embodiments of the present invention are explained in greater detail in the following text with reference to the attached drawing.

BRIEF DESCRIPTION OF THE DRAWINGS

The FIGURE shows a drive system 1 for a hybrid vehicle having a combustion engine 2 and an electromotor 3, each being provided to drive the vehicle.

DETAILED DESCRIPTION

The single FIGURE shows a drive system 1 for a hybrid vehicle having a combustion engine 2 and an electromotor 3, each being provided to drive the vehicle. Depending on the type, the vehicle may be driven in electric-only operation, i.e., using electromotor 3 exclusively, and/or in combustion-engine operation, i.e., solely by the combustion engine, and/or it may be driven in hybrid operation in which the combustion engine and the electromotor provide the drive torque jointly.

In a hybrid vehicle, the electric-only operation may be used when lower driving power is requested, and combustion engine 2 is switched on as well if, for example, a higher driving output is required or the current source capacitance is low, in order to drive the vehicle in hybrid operation, i.e., the drive torque is provided by electromotor 3 as well as combustion engine 2. In the transition from electric-only operation to hybrid operation, combustion engine 2 must be started from standstill. This is done with the aid of a hybrid clutch 4, via which the driven shafts of electromotor 3 and combustion engine 2 are able to be coupled to one another.

Hybrid clutch 4 may be implemented as what is generally referred to as proportional clutch, which—notwithstanding an engine speed difference—is able to set a specific adjustable transmitted torque between the driven shafts of electromotor 3 and combustion engine 2. For example, such a proportional clutch is embodied as what is known as friction clutch or slip clutch, in which the transmitted torque is able to be controlled or regulated via the pressure force between two clutch surfaces.

The activation of hybrid clutch 4 to start combustion engine 2 is accomplished with the aid of a hybrid-operation control circuit 5, in which a determination as to whether or not combustion engine 2 should be switched on as well is made as a function of performance quantities such as, for instance, driver-desired torque $M_{Soll}$, the power source capacitance (capacitance of the drive batteries) and the like. If combustion engine 2 is to be started up, then hybrid clutch 4 is controlled according to a manipulated clutch variable, in order to transmit a torque between drive motor 3 and combustion engine 2 to drag combustion engine 2.

When activating hybrid clutch 4, a torque for starting combustion engine 2 is withdrawn from the driven shaft of electromotor 3, which is unavailable for driving the vehicle. In the absence of additional counter measures, this leads to a sudden drop in the engine speed or drive torque supplied by electromotor 3, which manifests itself to the driver as jerking of the vehicle.

In electric-only operation, electromotor 3 is regulated with the aid of a closed-loop speed control 6 according to a setpoint engine speed $\omega_{Soll}$. To this end, closed-loop speed control 6 receives feedback via an engine speed sensor 7, which indicates instantaneous engine speed $\omega_{ist}$ of the driven shaft of electromotor 3. A sensor-less closed-loop speed control is conceivable as well.

Closed-loop speed control 6 regulates the instantaneous engine speed $\omega_{ist}$ to setpoint engine speed $\omega_{Soll}$ in the conventional known manner by supplying a manipulated variable to electromotor 3. In the transition to hybrid operation, hybrid clutch 4 relatively quickly samples a torque from the driven shaft of electromotor 3, and the sudden change in torque caused thereby induces a change in engine speed, which closed-loop speed control 6 is unable to compensate immediately because of the control delay.

The closed-loop speed control provides an actuating torque $M_{Stell}$ to electromotor 3 as manipulated variable, which represents a datum for electromotor 3 that leads to an instantaneous torque on the driven shaft of electromotor 3. Added to this actuating torque $M_{Stell}$ is a datum for a transmitted torque $M_{Ü}$ for obtaining a corrected actuating torque $M_{corr}$.

Transmitted torque $M_{Ü}$ corresponds to the torque provided by hybrid clutch 4 and corresponds to the instantaneous transmitted torque between combustion engine 2 and electromotor 3. Since transmitted torque $M_{Ü}$ is added to actuating torque $M_{Stell}$ after closed-loop speed control 6, there is the advantage that no control delay occurs in the transition to hybrid operation, during which time instantaneous engine speed $\omega_{ist}$ of the drive shaft is regulated to setpoint engine speed $\omega_{soll}$ again.

Since transmitted torque $M_{Ü}$ is added to actuating torque $M_{Stell}$, electromotor 3 may additionally and without delay be provided with the transmitted torque tapped via hybrid clutch 4 by electromotor 3, so that, essentially, no sudden drop occurs in the engine speed of the driven shaft of electromotor 3 in the transition to hybrid operation.

Hybrid clutch 4 provides the datum regarding transmitted torque $M_{Ü}$ either with the aid of a specific measured value of the transmitted torque or with the aid of a transmitted torque of the hybrid clutch estimated by the pressure force between clutch disks. To set a desired transmitted torque $M_{Ü}$, the pressure force between two clutch disks of a slip clutch may then be set accordingly. The pressure force is proportional to transmitted torque $M_{Ü}$ and may therefore likewise be used as datum for transmitted torque $M_{Ü}$. Furthermore, transmitted torque $M_{Ü}$ is also implementable by a position detection of the clutch disks. In general, hybrid clutch 4 should be developed in such a way that the transmitted torque is able to be estimated or measured and is supplied to summing element 8 as datum regarding transmitted torque $M_{Ü}$ where it is added to actuating torque $M_{Stell}$ supplied by the closed-loop speed control in order to obtain a corrected actuating torque $M_{corr}$.

Instead of a measured value or an estimated value derived from variables measured in hybrid clutch 4, the datum for the transmitted torque may also correspond to the manipulated clutch variable, which is supplied by hybrid-operation control circuit 5 of hybrid clutch 4 so as to set the corresponding transmitted torque.

If hybrid clutch 4 is completely disengaged, i.e., no torque is transmitted between drive motor 3 and combustion engine 2, then the provided system and method do not influence the closed-loop speed control, and the closed-loop speed control of drive motor 3 is implementable without adverse effect.

What is claimed is:

1. A method for controlling a hybrid vehicle having an electric drive motor and a combustion engine in a transition from an operation using only the drive motor to a hybrid operation using both the drive motor and the combustion engine, the method comprising:
   in the operation using only the drive motor, controlling a motor speed of the drive motor by transmitting to the drive motor a target torque signal generated based on a setpoint motor speed and detected instantaneous motor speed; and
   at the beginning of the transition to the hybrid operation, dragging the combustion engine by coupling it with the drive motor via a proportional clutch, and controlling the motor speed of the drive motor by transmitting to the drive motor a corrected target torque signal generated by adding the target torque signal to an instantaneous torque transmitted between the drive motor and the combustion engine.

2. The method of claim 1, wherein the instantaneous torque transmitted between the drive motor and the combustion engine is at least one of measured and estimated.

3. A device for controlling a hybrid vehicle having an electric drive motor and a combustion engine in a transition from an operation using only the drive motor to a hybrid operation using both the drive motor and the combustion engine, the device comprising:
- a control arrangement for controlling a motor speed of the drive motor, wherein in the operation using only the drive motor, the control arrangement controls the motor speed by transmitting to the drive motor a target torque signal generated based on a setpoint motor speed and detected instantaneous motor speed;
- a clutch for coupling the combustion engine with the drive motor at the beginning of the transition to the hybrid operation, so that the combustion engine is dragged using an instantaneous transmitted torque in the transition;
- a transmitted-torque supply device to provide a value of the instantaneous transmitted torque between the drive motor and the combustion engine; and
- a summing element configured to generate a corrected target torque signal by adding the target torque signal to the value of the instantaneous torque transmitted between the drive motor and the combustion engine in the transition to the hybrid operation, wherein the corrected target torque signal is used to control the motor speed of the drive motor in the transition.

4. The device of claim 3, wherein the transmitted-torque supply device is configured to at least one of measure and estimate the torque transmitted between the drive motor and the combustion engine by the clutch.

* * * * *